United States Patent
Kirchhof et al.

(10) Patent No.: US 9,086,152 B2
(45) Date of Patent: Jul. 21, 2015

(54) MECHANICAL FACE SEAL

(75) Inventors: Martin Kirchhof, Miesbach (DE);
Armin Laxander, Ebenhausen (DE);
Guenther Lederer, Geretsried (DE);
Thomas Keller, Geretsried (DE)

(73) Assignee: CARL FREUDENBERG KG, Weinheim (DE)

(*) Notice: Subject to any disclaimer, the term of this patent is extended or adjusted under 35 U.S.C. 154(b) by 0 days.

(21) Appl. No.: 13/642,574

(22) PCT Filed: Apr. 18, 2011

(86) PCT No.: PCT/EP2011/001956
§ 371 (c)(1),
(2), (4) Date: Oct. 22, 2012

(87) PCT Pub. No.: WO2011/131329
PCT Pub. Date: Oct. 27, 2011

(65) Prior Publication Data
US 2013/0038024 A1 Feb. 14, 2013

(30) Foreign Application Priority Data

Apr. 23, 2010 (DE) .......................... 10 2010 018 308
Jun. 18, 2010 (DE) .......................... 10 2010 024 289

(51) Int. Cl.
*F16J 15/34* (2006.01)

(52) U.S. Cl.
CPC .................................. *F16J 15/3468* (2013.01)

(58) Field of Classification Search
USPC .................................. 277/358, 370, 377, 390
See application file for complete search history.

(56) References Cited

U.S. PATENT DOCUMENTS

| 4,448,428 | A | 5/1984 | Marsi |
| 5,135,235 | A | 8/1992 | Parmar |
| 5,454,572 | A | 10/1995 | Pospisil |
| 5,490,679 | A | 2/1996 | Borrino et al. |
| 5,560,622 | A | 10/1996 | Sedy |
| 5,626,347 | A | 5/1997 | Ullah |
| 6,267,382 | B1 | 7/2001 | Auber |
| 6,325,380 | B1 | 12/2001 | Feigl et al. |
| 6,616,145 | B2 | 9/2003 | Schulten et al. |
| 6,688,602 | B2 | 2/2004 | Yamada et al. |
| 7,862,046 | B2 * | 1/2011 | Lederer et al. ................ 277/348 |

(Continued)

FOREIGN PATENT DOCUMENTS

| CN | 101652586 A | 2/2010 |
| DE | 29505251 U1 | 5/1995 |

(Continued)

OTHER PUBLICATIONS

European Patent Office, International Search Report in International Patent Application No. PCT/EP2011/001956 (Sep. 20, 2011).

(Continued)

*Primary Examiner* — Gilbert Lee
(74) *Attorney, Agent, or Firm* — Leydig, Voit & Mayer, Ltd.

(57) ABSTRACT

A mechanical face seal includes a rotating counter ring having a sealing surface and a stationary face seal ring having a sealing surface. The sealing surface of the counter ring is disposed opposite from the sealing surface of the face seal ring. The sealing surfaces of the counter ring and the face seal ring bear against each other.

23 Claims, 10 Drawing Sheets

(56) References Cited

U.S. PATENT DOCUMENTS

| | | | |
|---|---|---|---|
| 8,186,688 B2 * | 5/2012 | Akiyama | 277/365 |
| 2008/0086094 A1 | 4/2008 | Peters | |
| 2009/0134584 A1 | 5/2009 | Lederer et al. | |

FOREIGN PATENT DOCUMENTS

| | | | |
|---|---|---|---|
| DE | 29908918 U1 | 7/1999 | |
| DE | 20019881 U1 | 4/2001 | |
| DE | 10017669 A1 | 10/2001 | |
| DE | 202007016407 U1 | 1/2008 | |
| DE | 102006028153 A1 | 2/2008 | |
| EP | 0265147 A1 | 4/1988 | |
| EP | 0591565 A1 | 4/1994 | |
| EP | 1209386 A1 | 5/2002 | |
| EP | 2236870 A2 | 10/2010 | |
| JP | 63145876 A | 6/1988 | |
| JP | 335373 U | 4/1991 | |
| JP | 11287330 A | 10/1999 | |
| JP | 2001317637 A | 11/2001 | |
| JP | 2008303605 A | 12/2008 | |
| JP | 5302675 B2 | 10/2013 | |
| SU | 649916 A1 | 2/1979 | |
| SU | 649919 A | 2/1979 | |
| WO | WO 02064951 A1 | 8/2002 | |
| WO | WO 2009 107440 A1 | 9/2009 | |
| WO | WO2009107440 | * | 12/2009 |

OTHER PUBLICATIONS

Japanese Office Action, Japanese Patent Application No. 2013-505361 (Nov. 7, 2013).

* cited by examiner

MECHANICAL FACE SEAL

CROSS-REFERENCE TO PRIOR APPLICATIONS

This application is a U.S. National Phase application under 35 U.S.C. §371 of International Application No. PCT/EP2011/001956, filed on Apr. 18, 2011, and claims benefit to German Patent Application Nos. DE 10 2010 018 308.3, filed on Apr. 23, 2010, and DE 10 2010 024 289.6, filed on Jun. 18, 2010. The International Application was published in German on Oct. 27, 2011 as WO 2011/131329 under PCT Article 21(2).

FIELD

The invention relates to a mechanical face seal, comprising a rotating counter ring and a stationary face seal ring, whereby the counter ring and the face seal ring have sealing surfaces that bear against each other, and whereby the sealing surface of the counter ring is situated opposite from the sealing surface of the face seal ring.

BACKGROUND

Mechanical face seals are described above in European patent application EP 1 209 386 A1.

A counter ring can rotate with respect to the mean sliding surface diameter at sliding speeds of up to 200 m/s relative to the stationary face seal ring. At high sliding speeds, viscous friction in the sealing gap leads to a considerable heat input into the face seal ring and into the counter ring. Axial temperature gradients in the face seal ring and in the counter ring can cause severe deformation of the rings. The geometry of the sealing gap can change in an undesired or impermissible manner, specifically, in terms of the height of the sealing gap as well as its V-shaped widening.

European patent application EP 1 209 386 A1 describes providing a rotating counter ring with an axial projection in order to compensate for thermally caused warping of the rotating counter ring.

SUMMARY

In an embodiment, the present invention provides a mechanical face seal including a rotating counter ring having a sealing surface and a stationary face seal ring having a sealing surface. The sealing surface of the counter ring is disposed opposite from the sealing surface of the face seal ring. The sealing surfaces of the counter ring and the face seal ring bear against each other.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
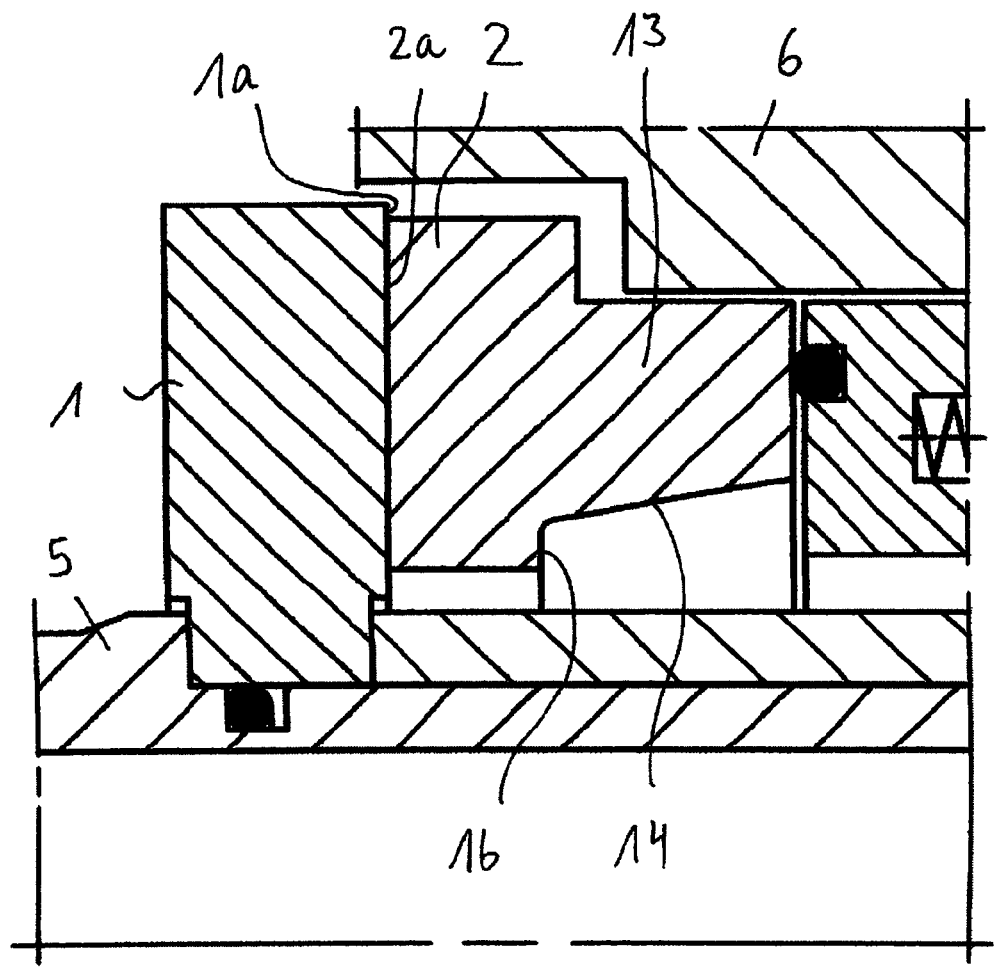
FIG. 1 shows a sectional view of a mechanical face seal of the state of the art.

It is a drawback of the prior-art mechanical face seals that, in spite of the known measures taken when high temperatures are encountered, the deformation behavior of the rotating counter ring does not always allow a reliable function in all of the operating states that occur.

However, the present invention recognizes that very high requirements are made of the function and operational reliability of mechanical face seals, in particular, when they are used in turbo machines such as, for example, compressors or gas turbines, where operating conditions that vary widely occur in terms of pressure, speed and temperature.

Therefore, according to an embodiment, the invention provides and refines a mechanical face seal that ensures a dependable function and operational reliability, even at varying and different sliding speeds, rotational speeds, pressures and temperatures.

The counter ring could have a first axial projection that protrudes from a radial plane of the counter ring, whereby the counter ring has a second axial projection that protrudes from the radial plane and that is at a distance from the first projection.

A second projection, which forms a valley with the first projection, can compensate for the tilting moments that occur as a result of axial temperature gradients. Although the person skilled in the art would expect that an additional projection would result in a relatively complex, difficult-to-manage deformation behavior of the counter ring, it was possible to take this approach. The first projection then interacts gently with the second projection when the counter ring is rotating. As a result, even in case of widely varying stresses in terms of pressure, speed and temperature, the counter ring surprisingly exhibits equal flexibility and stability regarding its deformation behavior. Consequently, an optimal geometry of the sealing gap is maintained, even under widely varying operating conditions.

The radial plane could face away from the sealing surface of the counter ring. Advantageously, this does not affect the sealing surfaces that bear against each other.

The first projection could be formed on the radially outer end of the counter ring, whereby the second projection faces the radially inner end of the counter ring. This stabilizes the rotation plane of the counter ring against tilting.

The first projection could be formed with a trapezoidal cross section. This concrete embodiment has proven to be especially advantageous since this brings about a positive mass distribution and shifting of the center of gravity within the counter ring.

Before this backdrop, the second projection could be configured with a trapezoidal cross section. This avoids planes that are oriented parallel to the axis of rotation on which fluids, especially liquid lubricants, can collect.

The projections could have rounded-off edges. In this manner, secondary flow separations on the projections can be minimized.

The first projection could have a larger extension than the second projection. Surprisingly, this results in equally flexible as well as stable deformation behavior of the rotating counter ring under all kinds of different operating conditions.

The face seal ring could have an axial projection whose radially inner flank has recesses.

Surprisingly, this results in a virtually constant gap width. The motion behavior and deformation behavior of the stationary face seal ring follow that of the rotating counter ring in such a way that the sealing gap between the sealing surfaces is not widened or reduced in size in an impermissible manner. When the counter ring is rotating, the recesses interact gently with it, as a result of which the counter ring rotates surprisingly stably and steadily, and the face seal ring follows it axially. The stable and steady rotation yields a very high level of tightness and an optimized gap width between the sealing surfaces.

Whenever mention is made of "gap width" in this description, this refers to the axial distance between the sealing surfaces. The person skilled in the art also refers to this axial distance as the "gap height". No seals or sealing elements are arranged in the recesses. The recesses are also free of centering elements that bear axially or radially against the radially inner flank.

The radially inner flank could be configured to be stepped. It is easy to make steps in the body of the face seal ring.

The radially inner flank could open up into a first radial plane of the face seal ring, whereby a radially outer flank of the face seal ring opens up into a second radial plane of the face seal ring, and whereby the first and the second radial planes are at differing distances from the sealing surface of the face seal ring. This concrete embodiment yields a very favorable shape for the face seal ring so that the sealing gap between the sealing surfaces is virtually constant.

EP 1 209 386 A1 describes that a space facing the sealing surface of the face seal ring is sealed with respect to a space on the housing side in which the pressure ring is arranged. The seal is achieved by a sealing consisting of a single sealing element. The sealing element simultaneously bears against the pressure ring, the face seal ring and the second housing wall.

A drawback of the prior-art mechanical face seal is that the sealing element restricts the freedom of motion of the face seal ring. In this process, especially "stick-slip" behavior can be observed.

However, very high requirements are made of the function and operational reliability of mechanical face seals, in particular, when they are used in turbo machines such as, for example, compressors or gas turbines, where operating conditions that vary widely occur in terms of pressure, speed and temperature.

Here, it is desirable to configure and refine a mechanical face seal of the above-mentioned type in such a way that it ensures a dependable function and operational reliability, even at varying and different speeds, pressures and temperatures.

Before this backdrop, the face seal ring could be pressed by a pressure ring against the counter ring, whereby the pressure ring is supported via a spring element against a first housing wall, whereby a sealing unit is provided between the pressure ring and a second housing wall as well as between the pressure ring and the face seal ring, and whereby the sealing unit has two sealing elements that are uncoupled and separate from each other.

Two sealing elements that are uncoupled and separate from each other can optimally fulfill different sealing tasks in that different materials are selected. Here, it has especially been recognized that the elasticity properties and the morphological properties of the sealing elements can be adapted to a given installation situation independently of each other. As a result, even under widely varying stresses in terms of pressure, speed and temperature, the face seal ring surprisingly exhibits equal flexibility and stability regarding its motion behavior. Consequently, an optimal geometry of the sealing gap is maintained, even under widely varying operating conditions.

Before this backdrop, a first sealing element could bear exclusively against the face seal ring and against the pressure ring. In this manner, a reliable seal can be attained between the axially opposite boundary surfaces of the face seal ring and of the pressure ring.

A second sealing element could bear exclusively against the pressure ring and against the second housing wall. In this manner, a reliable seal can be attained between the radially opposite boundary surfaces of the pressure ring and of the housing.

The first sealing element could be made of an elastomer. An elastomer is normally sufficiently soft and can therefore very reliably create a seal between the axially opposite boundary surfaces of the face seal ring and of the pressure ring.

The second sealing element could be made of polytetrafluorethylene (PTFE). This material advantageously does not adhere to the second housing wall and gives the pressure ring a certain mobility relative to the housing.

The second sealing element could be configured with a U-shaped cross section, at least in certain areas. This allows the second sealing element to have a spreading action. A U-shape involves two projecting legs that can each bear against the pressure ring and the second housing wall under contact pressure.

A drawback of the prior-art mechanical face seal is that dirt can get into the space on the housing side. The dirt can enter from the side facing away from the face seal ring.

Here, friction damage can occur due to the dirt particles that manage to get in, especially dust that gets in. This can cause unfavorable changes to the surface texture between the sealing element and the housing. This can be associated with a deterioration of the sliding behavior of the pressure ring relative to the housing. Consequently, unfavorable changes to the geometry of the sealing gap can occur.

However, very high requirements are made of the function and operational reliability of mechanical face seals, in particular, when they are used in turbo machines such as, for example, compressors or gas turbines, where operating conditions that vary widely occur in terms of pressure, speed and temperature.

Here, it is desirable to configure and refine a mechanical face seal of the above-mentioned type in such a way that it ensures a dependable function and operational reliability, even at varying and different speeds, pressures and temperatures.

Before this backdrop, the face seal ring could be pressed by a pressure ring against the counter ring, whereby the pressure ring is supported via a spring element against a first housing wall, whereby a sealing unit is provided between the pressure ring and a second housing wall as well as between the pressure ring and the face seal ring, and whereby the pressure ring, together with the housing walls, delimits a space that is shielded against dirt getting in.

Such shielding prevents dirt from getting in. This has virtually no negative effect on the surface texture between the sealing element and the housing. Thus, a deterioration of the motion behavior of the pressure ring relative to the housing can be positively countered. Consequently, unfavorable changes to the geometry of the sealing gap can be avoided. Consequently, an optimal geometry of the sealing gap is maintained, even under widely varying operating conditions.

The pressure ring could have an axially projecting annular wall whose radially outer surface is situated opposite from the radially inner end of the first housing wall. This achieves an accommodation of the pressure ring and of the spring element in an annular space on the housing side. Advantageously, no fragments can escape to the outside if the spring element breaks.

The annular wall could project in the axial direction beyond the first housing wall. Such an overhang reliably prevents dust from getting into the space in which the spring element is accommodated.

In the first and/or second housing wall, a passage could be formed through which dirt that is already present can leave the space. The passage is advantageously configured on the side that faces away from the face seal ring behind the pressure ring. Since the passage is configured in a lower area of the housing, dirt that has already gotten in can leave the space due to the force of gravity.

Before this backdrop, European patent application EP 1 209 386 A1 describes to non-rotatably clamp a rotating counter ring onto a shaft by means of a bushing and a clamping element.

A drawback of the prior-art mechanical face seals is that the rotating counter ring can execute undesired tilting motions during the rotation. This can result in undesired changes to the geometry of the sealing gap between the sealing surfaces. Then the mechanical face seal can no longer ensure a reliable function during all of the operating states that occur.

However, very high requirements are made of the function and operational reliability of mechanical face seals, in particular, when they are used in turbo machines such as, for example, compressors or gas turbines, where operating conditions that vary widely occur in terms of pressure, speed and temperature.

According to an embodiment of the invention, a mechanical face seal is configured and refined in such a way that a dependable function and operational reliability is ensured, even at varying and different speeds, pressures and temperatures.

Before this backdrop, the counter ring could have two radial planes, each of which is associated with a clamping cam.

Axially projecting clamping cams can ensure a defined clamping of the counter ring. Any tilting moments that occur can be compensated for and avoided surprisingly easily. Here, it has been recognized that a counter ring clamped between clamping elements can undergo frictional contact with said elements. In this process, frictional forces occur that bring about tilting moments. It was then recognized that clamping cams can be arranged in such a way that the occurring tilting moments compensate for each other. Here, it was concretely recognized that the clamping cams define a plane on which the tilting moments can act in a defined manner that can be compensated for. Therefore, the counter ring surprisingly displays a high degree of stability regarding its tilting behavior, even in case of widely varying stresses in terms of pressure, speed and temperature. As a result, an optimal geometry of the sealing gap is maintained, even under operating conditions that vary widely.

The concept of associating the clamping cams with the radial planes refers either to the formation of the clamping cams directly on the counter ring or else on the clamping elements of the shaft.

The counter ring could have two radial planes from each of which a clamping cam projects in the axial direction. Advantageously, the clamping cams are configured on the counter ring and not on the bushing and on the clamping element. This has to do with the fact that the material used for the counter ring is softer than the materials used for the bushing and for the clamping element. Moreover, an effort is made to achieve uniform wear of the clamping cams.

The clamping cams could be configured to be annular and concentric with respect to the counter ring. In this manner, the counter ring can be anchored on the shaft by means of line pressure.

The clamping cams could be formed from the counter ring and configured in one piece with it.

The clamping cams could be configured at the same height on both sides of the counter ring in the radial direction. This ensures that tilting moments that occur are exerted on the same plane and can advantageously compensate for each other.

Tilting moments occur as soon as the counter ring and the shaft move radially relative to each other. These tilting moments are compensated for in that the clamping cams are arranged at the same radial height.

One arrangement could have a mechanical face seal of the type described here as well as a shaft, whereby the counter ring is non-rotatably joined to the shaft by means of a clamping element and a bushing, and whereby a first clamping cam bears against the bushing while the second clamping cam bears against the clamping element. Due to the bushing and the clamping element, the counter ring can be clamped onto the shaft in a defined manner.

The mechanical face seal described here is especially well-suited for use in turbo machines such as, for example, compressors or gas turbines, since such a seal ensures a reliable function, even at varying and different sliding speeds, pressures and temperatures.

The mechanical face seal described here seals a gas or a mixture of a gas and a liquid, whereby the sealing surfaces are gas-lubricated.

There are various possibilities for configuring and refining the teaching of the present invention in an advantageous manner. For this purpose, on the one hand, reference is hereby made to the following claims and, on the other hand, to the explanation below of a preferred embodiments of the mechanical face seal according to the invention on the basis of the drawings.

Generally preferred embodiments and refinements of the teaching are explained in conjunction with the explanation of the preferred embodiments.

FIG. 1 shows a mechanical face seal of the state of the art.

The mechanical face seal shown in FIG. 1 comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2.

The rotating counter ring 1 is firmly associated with a rotating shaft 5 and rotates along with it. The stationary face seal ring 2 is arranged in a housing 6 so as to be loosely centered.

Figure 2:
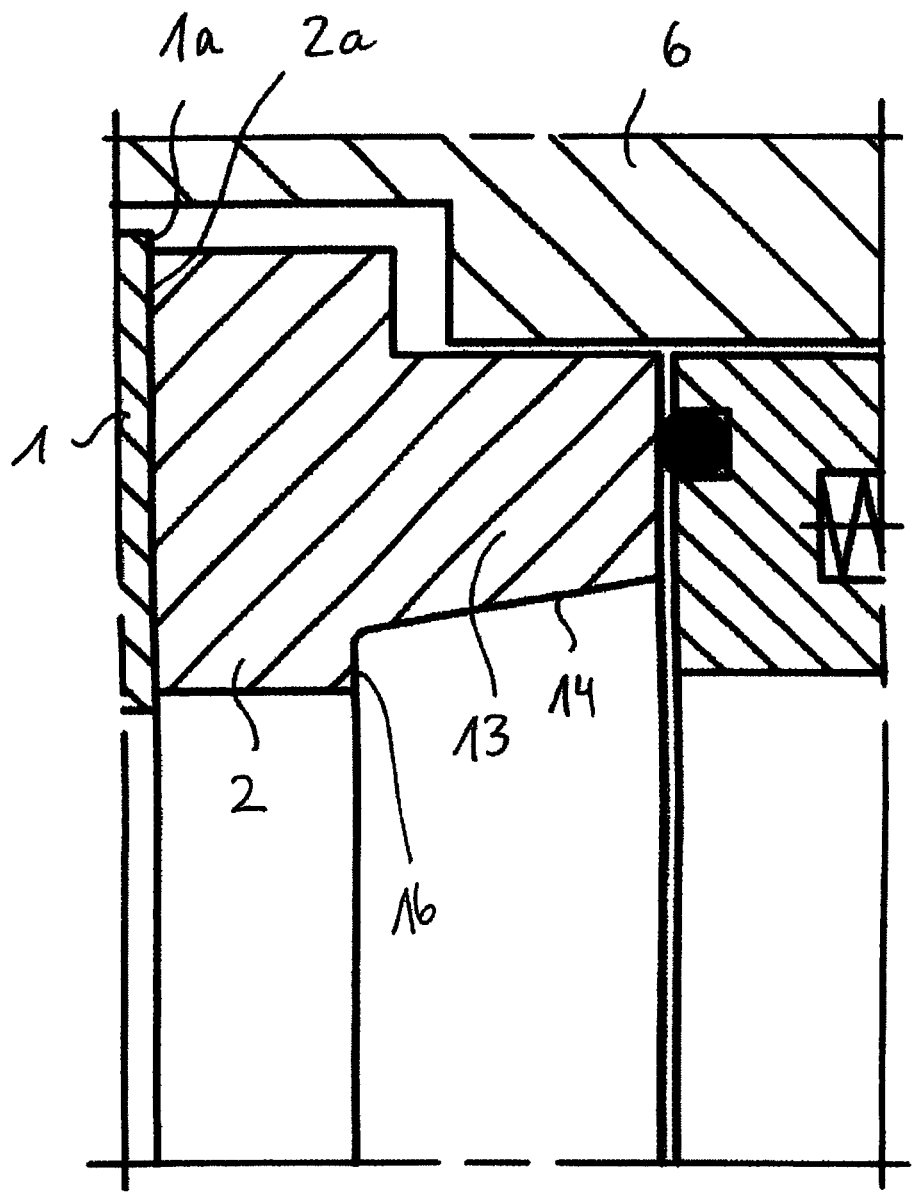
FIG. 2 shows a sectional view of the part of the mechanical face seal on the housing side according to FIG. 1.

FIG. 2 shows the part of the mechanical face seal on the housing side according to FIG. 1.

Figure 3:
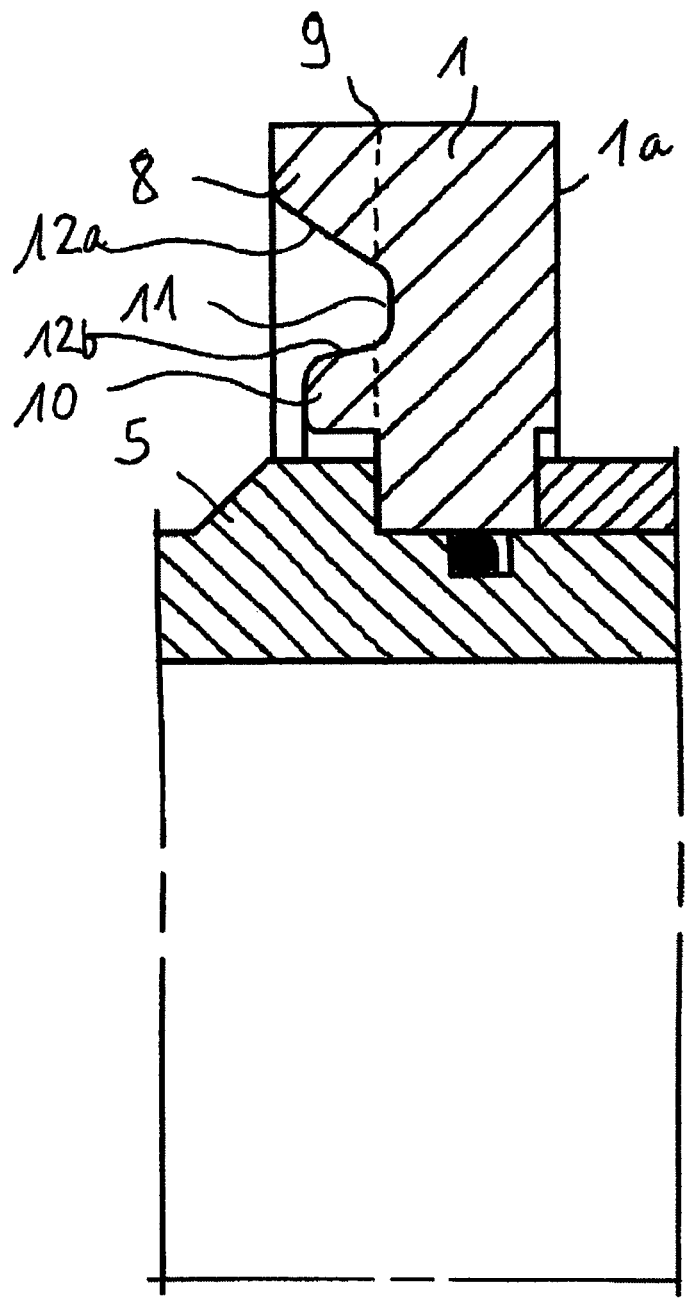
FIG. 3 shows a sectional view of a part of the mechanical face seal according to an embodiment of the present invention on the shaft side, in which the rotating counter ring has two projections in the axial direction.
Figure 4:
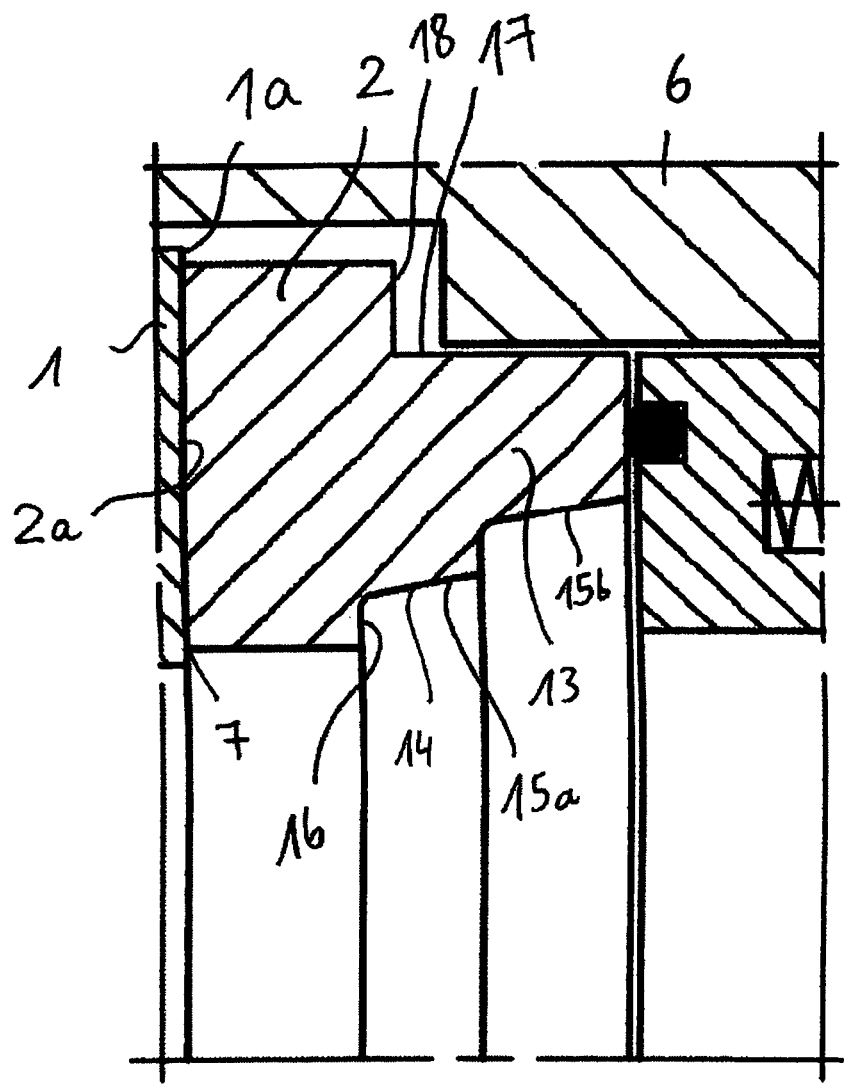
FIG. 4 shows a sectional view of a part of a mechanical face seal according to an embodiment of the present invention on the housing side, in which the stationary face seal ring has an axial projection in which a stepped flank is formed.

FIG. 3 shows a part of the mechanical face seal on the shaft side, while FIG. 4 shows a part of a mechanical face seal on the housing side. Here, the part on the housing side according to FIG. 4 can be combined with the part on the shaft side according to FIG. 3 or with the part on the shaft side according to FIG. 1.

The mechanical face seal shown in FIGS. 3 and 4 comprises a rotating counter ring 1 and a stationary face seal ring 2, whereby the counter ring 1 and the face seal ring 2 have sealing surfaces 1a, 2a that bear against each other, and whereby the sealing surface 1a of the counter ring 1 is opposite from the sealing surface 2a of the face seal ring 2. Here, a sealing gap 7 is formed between the sealing surfaces 1a, 2a. The rotating counter ring 1 is firmly associated with a rotating shaft 5 and rotates along with it. The stationary face seal ring 2 is arranged in a housing 6 so as to be loosely centered.

The counter ring 1 has a first axial projection 8 that protrudes axially from a radial plane 9 of the counter ring 1 (indicated by a broken line). The counter ring 1 has a second axial projection 10 that protrudes axially from the radial plane 9 and that is at a radial distance from the first projection 8.

Concretely speaking, the first projection 8 and the second projection 10 delimit a valley 11 that lies somewhat lower than the radial plane 9. However, the valley 11 could also lie somewhat higher than the radial plane 9. The counter ring 1 is made of metal and has a diameter (inner dimension) of 300 mm.

The radial plane 9 faces axially away from the sealing surface 1a of the counter ring 1. The first projection 8 is configured on the radially outer end of the counter ring 1, whereby the second projection 10 faces the radially inner end of the counter ring 1.

The first projection 8 and the second projection 10 are configured with a trapezoidal cross section. The projections 8, 10 have rounded-off edges 12a, 12b.

The first projection 8 has a larger extension than the second projection 10.

FIG. 4 shows that the face seal ring 2 has an axial projection 13 whose radially inner flank 14 has recesses 15a, 15b. The radially inner flank 14 is configured to be stepped.

The radially inner flank 14 opens up into a first radial plane 16 of the face seal ring 2, whereby a radially outer flank 17 of the face seal ring 2 opens up into a second radial plane 18 of the face seal ring 2, and whereby the first and the second radial planes 16, 18 are at differing distances from the sealing surface 2a of the face seal ring 2.

The face seal ring 2 is made of a carbon material.

Figure 5:
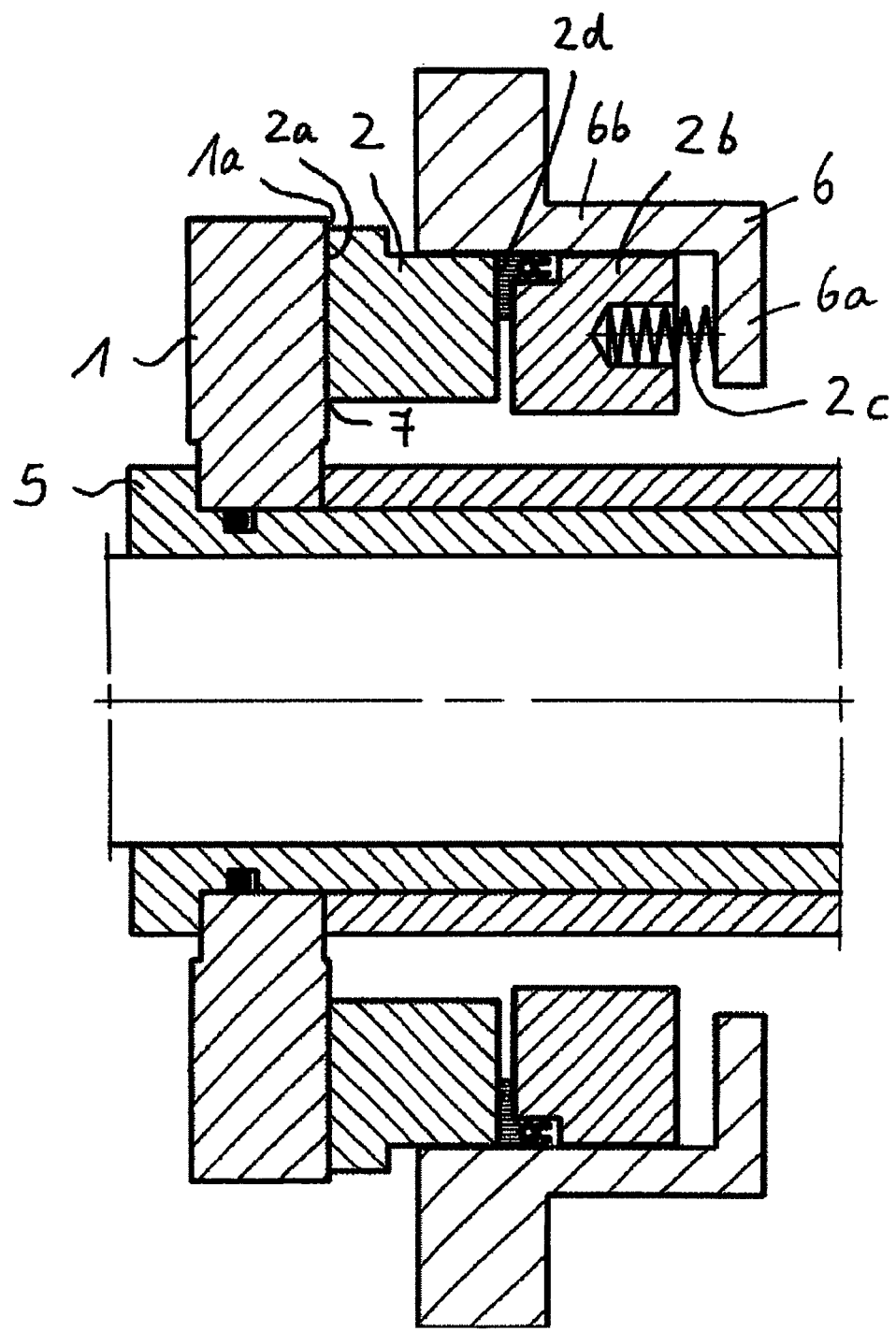
FIG. 5 shows a sectional view of a mechanical face seal of the state of the art, in which a single sealing element is associated with the pressure ring.

FIG. 5 shows a mechanical face seal of the state of the art.

The mechanical face seal shown in FIG. 1 comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2, whereby the face seal ring 2 is pressed by a pressure ring 2b against the counter ring 1, whereby the pressure ring 2b is supported via a spring element 2c against a first housing wall 6a, and whereby a sealing unit 2d is provided between the pressure ring 2b and a second housing wall 6b as well as between the pressure ring 2b and the face seal ring 2.

The rotating counter ring 1 is firmly associated with a rotating shaft 5 and rotates along with it. The stationary face seal ring 2 is arranged in a housing 6 so as to be loosely centered. Here, a sealing gap 7 is formed between the sealing surfaces 1a, 2a.

Figure 6:
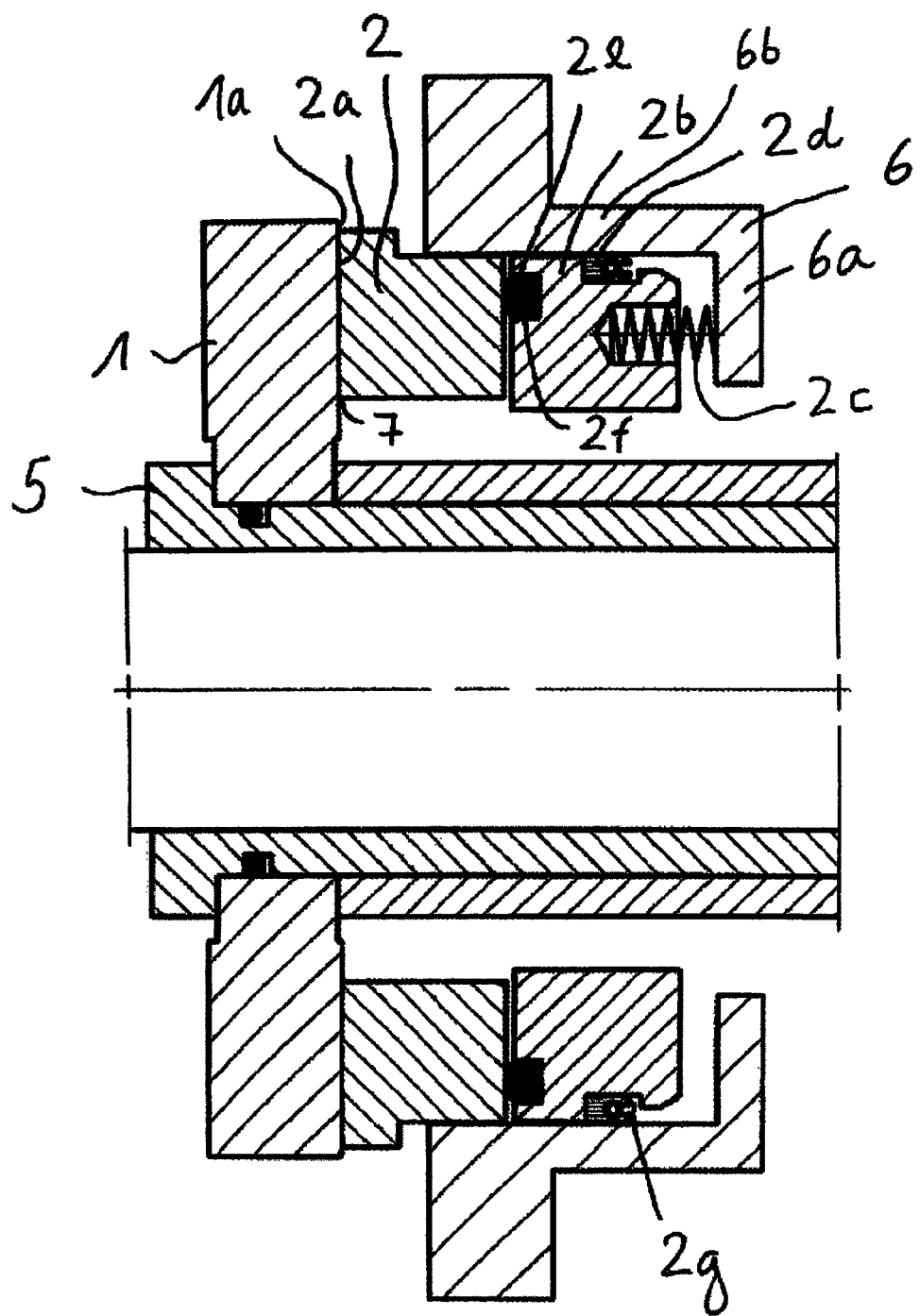
FIG. 6 shows a sectional view of a mechanical face seal according to an embodiment of the present invention, in which two sealing elements that are uncoupled and separate from each other are associated with the pressure ring.

FIG. 6 shows a mechanical face seal that comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2, whereby the face seal ring 2 is pressed by a pressure ring 2b axially against the counter ring 1, whereby the pressure ring 2b is supported via a spring element 2c against a first housing wall 6a, and whereby a sealing unit 2d, 2e is provided between the pressure ring 2b and a second housing wall 6b as well as between the pressure ring 2b and the face seal ring 2, whereby the sealing unit 2d, 2e has two sealing elements 2d, 2e that are uncoupled and separate from each other.

A first sealing element 2e bears exclusively against the face seal ring 2 and against the pressure ring 2b. A second sealing element 2d bears exclusively against the pressure ring 2b and against the second housing wall 6b.

The first sealing element 2e is made of an elastomer. The first sealing element 2e is in a groove 2f of the pressure ring 2b, which axially faces the face seal ring 2. The first sealing element 2e is configured as an O-ring.

The second sealing element 2d is made of polytetrafluoroethylene (PTFE). The second sealing element 2d is configured at least in certain areas with a U-shaped cross section. A V-shaped configuration is also conceivable here. It circumferentially surrounds the pressure ring 2b and lies in a peripherally encircling annular groove 2g.

The counter ring 1 is made of metal and has a diameter (inner dimension) of 300 mm. The face seal ring 2 is made of a carbon material.

The rotating counter ring 1 is firmly associated with a rotating shaft 5 and rotates along with it. The stationary face seal ring 2 is arranged in a housing 6 so as to be loosely centered. Here, a sealing gap 7 is formed between the sealing surfaces 1a, 2a.

Figure 7:
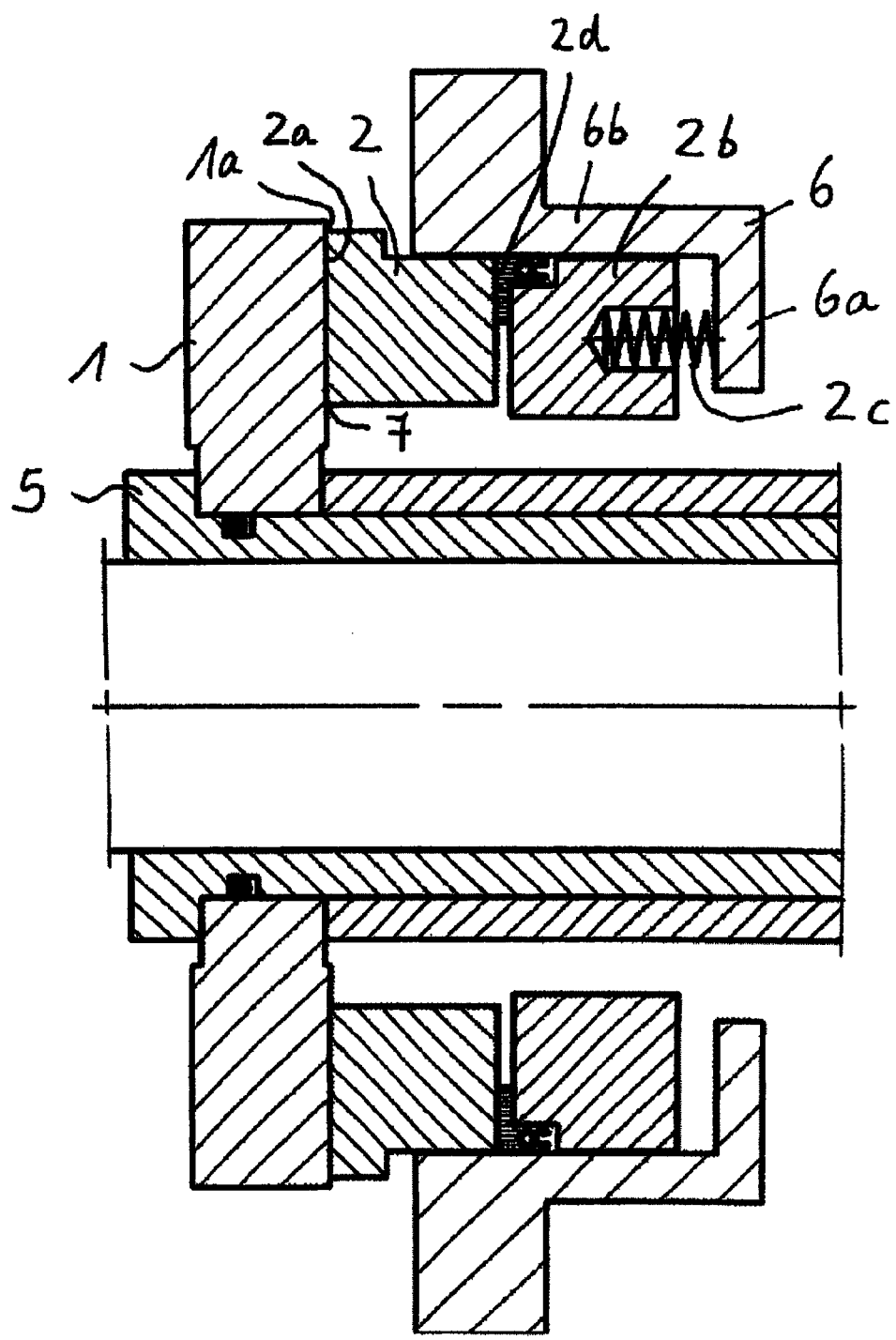
FIG. 7 shows a sectional view of a mechanical face seal of the state of the art, in which a single sealing element is associated with the pressure ring.

FIG. 7 shows a mechanical face seal of the state of the art.

The mechanical face seal shown in FIG. 7 comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2, whereby the face seal ring 2 is pressed by a pressure ring 2b against the counter ring 1, whereby the pressure ring 2b is supported via a spring element 2c against a first housing wall 6a, and whereby a sealing unit 2d is provided between the pressure ring 2b and a second housing wall 6b as well as between the pressure ring 2b and the face seal ring 2.

The rotating counter ring 1 is firmly associated with a rotating shaft 5 and rotates along with it. The stationary face seal ring 2 is arranged in a housing 6 so as to be loosely centered. Here, a sealing gap 7 is formed between the sealing surfaces 1a, 2a.

Figure 8:
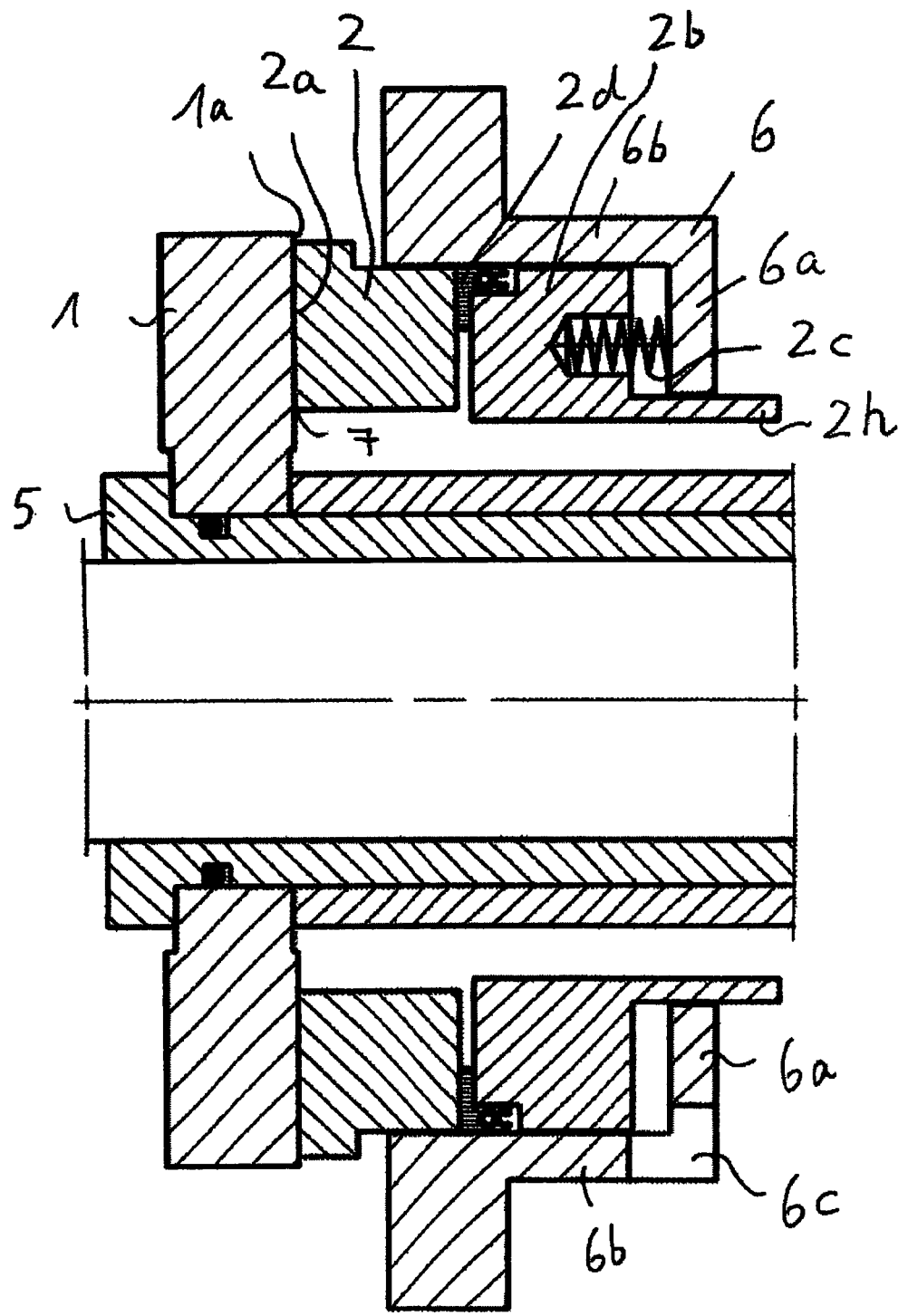
FIG. 8 shows a sectional view of a mechanical face seal according to an embodiment of the present invention, in which an axially projecting annular wall is associated with the pressure ring.

FIG. 8 shows a mechanical face seal that comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2, whereby the face seal ring 2 is pressed by a pressure ring 2b axially against the counter ring 1, whereby the pressure ring 2b is supported via a spring element 2c against a first housing wall 6a, and whereby a sealing unit 2d is provided between the pressure ring 2b and a second housing wall 6b as well as between the pressure ring 2b and the face seal ring 2.

The pressure ring 2b, together with the housing walls 6a, 6b, delimits a space that is shielded against dirt getting in. The space is configured on the side of the pressure ring 2b facing away from the face seal ring 2. The space, namely, the space on the housing side, is configured as an annular space in which the spring element 2c is accommodated.

The pressure ring 2b has an axially projecting annular wall 2h whose radially outer surface is opposite from the radially inner end of the first housing wall 6a. Here, the annular wall 2h projects in the same direction in which the spring element 2c projects from the pressure ring 2b. The spring element 2c is accommodated in a blind hole in the pressure ring 2b and is configured as a cylindrical compression spring.

The annular wall 2h projects over the first housing wall 6a in the axial direction. On the side of the first housing wall 6a facing away from the pressure ring 2b, the annular wall 2h projects with an annular overhang away from the first housing wall 6a.

In the first and second housing walls 6a, 6b, a passage 6c is formed through which dirt can leave the space. The passage 6c is advantageously configured on the side that faces axially away from the face seal ring 2 behind the pressure ring 2b. Since the passage 6c is configured in a lower area of the housing 6, dirt that has already gotten in can leave out of the space due to the force of gravity.

The counter ring 1 is made of metal and has a diameter (inner dimension) of 300 mm. The face seal ring 2 is made of a carbon material.

The rotating counter ring 1 is firmly associated with a rotating shaft 5 and rotates along with it. The stationary face seal ring 2 is arranged in a housing 6 so as to be loosely centered. Here, a sealing gap 7 is formed between the sealing surfaces 1a, 2a.

Figure 9:
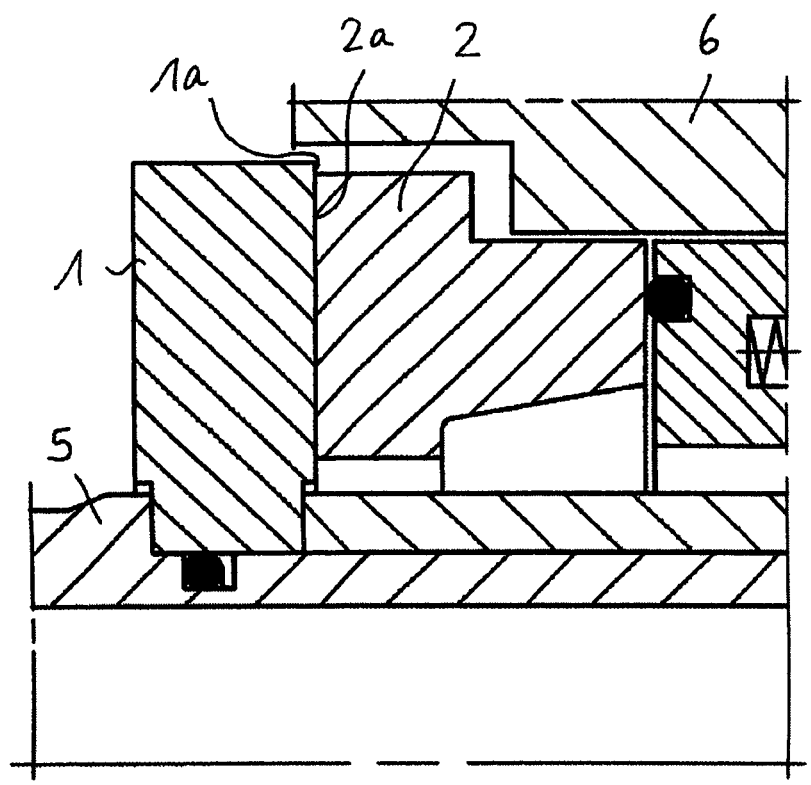
FIG. 9 shows a sectional view of a mechanical face seal of the state of the art, in which the rotating counter ring does not have a clamping cam in the axial direction.

FIG. 9 shows a mechanical face seal of the state of the art.

The mechanical face seal shown in FIG. 9 comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2.

The rotating counter ring 1 is firmly associated with a rotating shaft 5 and rotates along with it. The stationary face seal ring 2 is arranged in a housing 6 so as to be loosely centered.

Figure 10:
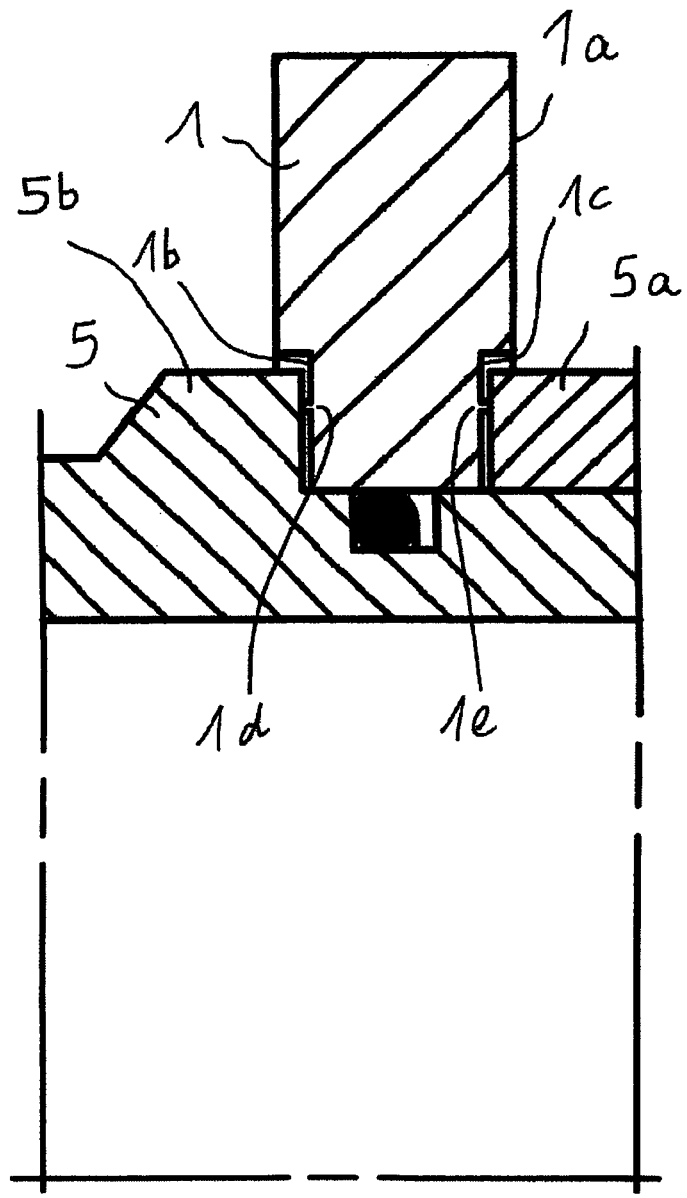
FIG. 10 shows a sectional view of a part of a mechanical face seal on the shaft side according to an embodiment of the present invention, in which the counter ring has clamping cams projecting to both sides.

FIG. 10 shows the part of a mechanical face seal on the shaft side, whose structure is analogous to that of the mechanical face seal according to FIG. 9, comprising a rotating counter ring 1 and a stationary face seal ring 2, whereby the counter ring 1 and the stationary face seal ring 2 have sealing surfaces 1a, 2a that bear against each other, whereby the sealing surface 1a of the counter ring 1 is axially opposite from the sealing surface 2a of the face seal ring 2. The counter ring 1 has two axially opposite radial planes 1b, 1c from each of which a clamping cam 1d, 1e projects in the axial direction. The clamping cams 1d, 1e project from the counter ring 1 to both sides.

The clamping cams 1d, 1e are configured to be annular and concentric with respect to the counter ring 1. However, they can also be configured only partially on the radial planes 1b, 1c.

The radial planes 1b, 1c are offset axially inwards with respect to the sealing surface 1a as well as with respect to the radial plane opposite from the sealing surface 1a.

The clamping cams 1d, 1e are configured on both sides of the counter ring 1 in the radial direction at the same height relative to the axis of rotation of the shaft 5.

Concretely, FIG. 10 shows the part of an arrangement on the shaft side, comprising a mechanical face seal of the type described above and a rotating shaft 5, whereby the counter ring 1 is non-rotatably joined to the shaft 5 by means of a clamping element 5a and a bushing 5b, and whereby a first clamping cam 1d bears against the bushing 5b, while the second clamping cam 1e bears against the clamping element 5a.

Advantageously, the clamping cams 1d, 1e are configured on the counter ring 1 and not on the bushing 5b and on the clamping element 5a. This has to do with the fact that the material used for the counter ring 1 is softer than the materials used for the bushing 5b or for the clamping element 5a. Moreover, an effort is made to achieve uniform wear of the clamping cams 1d, 1e.

The counter ring 1 is made of metal and has a diameter (inner dimension) of 300 mm.

The face seal ring 2 is made of a carbon material.

Regarding other advantageous embodiments and refinements of the teaching according to the invention, reference is made to the general part of the description on the one hand, and to the accompanying patent claims on the other hand.

Finally, it must be explicitly pointed out that all of the embodiments disclosed in the description and/or in the claims as well as combinations of mechanical face seals and mechanical face seal arrangements are being disclosed here, irrespective of the way they are concretely depicted in the figures.

The invention claimed is:

1. A mechanical face seal, comprising:
   a rotating counter ring having a sealing surface, the counter ring including:
   a first axial projection that protrudes from a radial plane of the counter ring and is disposed at a radially outer end of the counter ring; and
   a second axial projection that protrudes from the radial plane and is spaced from and facing a radially inner end of the counter ring, wherein the second axial projection is disposed at a distance from the first axial projection and the first projection protrudes further from the radial plane than the second projection; and
   a stationary face seal ring having a sealing surface, the sealing surface of the counter ring being disposed opposite from the sealing surface of the face seal ring, the sealing surfaces of the counter ring and the face seal ring bearing against each other;
   wherein the first axial projection and the second axial projection protrude away from the stationary face seal.

2. The mechanical face seal according to claim 1, wherein the radial plane faces away from the sealing surface of the counter ring.

3. The mechanical face seal according to claim 1, wherein the first projection has a trapezoidal cross section.

4. The mechanical face seal according to claim 1, wherein the second projection has a trapezoidal cross section.

5. The mechanical face seal according to claim 1, wherein the projections have rounded-off edges.

6. The mechanical face seal according to claim 1, wherein the face seal ring includes an axial projection having a radially inner flank with recesses.

7. The mechanical face seal according to claim 6, wherein the radially inner flank has a stepped configuration.

8. The mechanical face seal according to claim 6, Wherein the radially inner flank opens up into a first radial plane of the face seal ring and a radially outer flank of the face seal ring opens up into a second radial plane of the face seal ring, and the first and the second radial planes being disposed at different distances from the sealing surface of the face seal ring.

9. The mechanical face seal according to claim 1, wherein the face seal ring is pressed by a pressure ring against the counter ring, the pressure ring being supported via a spring element against a first housing wall, a sealing unit being disposed between the pressure ring and a second housing wall and between the pressure ring and the face seal ring, the sealing unit having a first and a second sealing element that are uncoupled and separate from each other.

10. The mechanical face seal according to claim 9, wherein the first sealing element bears exclusively against the face seal ring and against the pressure ring.

11. The mechanical face seal according to claim 9, wherein the second sealing element bears exclusively against the pressure ring and against the second housing wall.

12. The mechanical face seal according to claim 9, wherein the first sealing element is made of an elastomer.

13. The mechanical face seal according to claim 9, wherein the second sealing element is made of polytetrafluorethylene (PTFE).

14. The mechanical face seal according to claim 9, wherein the second sealing element has a U-shaped cross section.

15. The mechanical face seal according to claim 1, wherein the face seal ring is pressed by a pressure ring against the counter ring, the pressure ring being supported via a spring element against a first housing wall, a sealing unit being disposed between the pressure ring and a second housing wall and between the pressure ring and the face seal ring, the pressure ring, together with the housing walls, delimiting a space that is shielded against ingress of dirt.

16. The mechanical face seal according to claim 15, wherein the pressure ring has an axially projecting annular wall with a radially outer surface disposed opposite from a radially inner end of the first housing wall.

17. The mechanical face seal according to claim 16, wherein the annular wall projects in an axial direction beyond the first housing wall.

18. The mechanical face seal according to claim 15, further comprising a passage disposed in at least one of the first and second housing walls configured to allow dirt to exit the space.

19. The mechanical face seal according to claim 1, wherein the counter ring has two radial planes each being associated with a clamping cam.

20. The mechanical face seal according to claim 19, wherein the clamping cams project in an axial direction from their respective radial planes.

21. The mechanical face seal according to claim 19, wherein the clamping cams are annular and coaxial with respect to the sealing surface of the counter ring.

22. The mechanical face seal according to claim 19, wherein the clamping cams have a same height on both sides of the counter ring in the radial direction.

23. An arrangement, comprising:
a mechanical face seal, comprising:
a rotating counter ring having a sealing surface, the counter ring including a first axial projection that protrudes from a radial plane of the counter ring and is disposed at a radially outer end of the counter ring and a second axial projection that protrudes from the radial plane and is spaced from and facing a radially inner end of the counter ring, wherein the second axial projection is disposed at a distance from the first axial projection and the first projection protrudes further from the radial plane than the second projection;
a stationary face seal ring having a sealing surface, the sealing surface of the counter ring being disposed opposite from the sealing surface of the face seal ring, the sealing surfaces of the counter ring and the face seal ring bearing against each other; and
first and second clamping cams, and
a shaft, the counter ring being non-rotatably joined to the shaft via a clamping element and a bushing, the first clamping cam bearing against the bushing and the second clamping cam bearing against the clamping element.

* * * * *